United States Patent [19]

Martinez Parra

[11] 4,446,378
[45] May 1, 1984

[54] SYSTEM FOR THE GENERATION OF ELECTRICAL ENERGY BY UTILIZING THE KINETIC ENERGY OF SEAWATER

[76] Inventor: José MARTINEZ PARRA Calle Salitre 33-1°, Edificio Juan XXIII, Cartagena, Murcia, Spain

[21] Appl. No.: 280,125

[22] Filed: Jul. 2, 1981

[51] Int. Cl.³ ............................ F03B 7/00; F03B 13/10
[52] U.S. Cl. ....................................... 290/54; 415/2 R; 415/7; 416/85
[58] Field of Search ........................ 290/42, 43, 53, 54; 415/2 R, 3 R, 7; 416/84-86; 417/100, 330, 331, 337; 60/398

[56] References Cited

U.S. PATENT DOCUMENTS

| | | | |
|---|---|---|---|
| 583,355 | 5/1897 | Barton et al. | 415/7 |
| 1,368,454 | 2/1921 | Rebman | 416/85 |
| 1,491,688 | 4/1924 | Ford | 415/2 A |
| 1,560,309 | 11/1925 | Petersen | 415/7 |
| 4,270,056 | 5/1981 | Wright | 290/54 |

FOREIGN PATENT DOCUMENTS 7824327 3/1980 France .
143435 5/1920 United Kingdom .

Primary Examiner—G. Z. Rubinson
Assistant Examiner—Shelley Wade
Attorney, Agent, or Firm—Kenyon & Kenyon

[57] ABSTRACT

The subject-matter of the present invention is a system for the generation of electrical energy by utilizing the kinetic energy of seawater, comprising a floating body exhibiting two floating supports (1) connected by a lower platform (2), a main deck and a large impeller (5) arranged between them and having a horizontal axis (12). The impeller axis is carried by vertical platelike supports (4) which divide the impeller vanes into several sectors. The rotary movement of the impeller is transmitted to a machine park (19-22) located on the main deck (3) for the generation of electrical energy. Despite its large dimensions the system according to the invention is distinguished by its high stability (FIG. 7).

6 Claims, 8 Drawing Figures

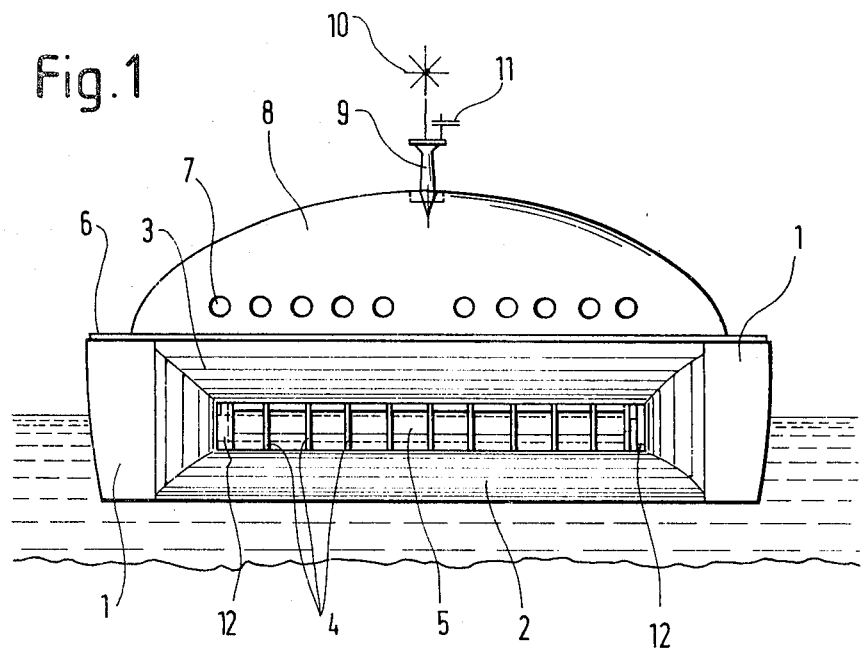
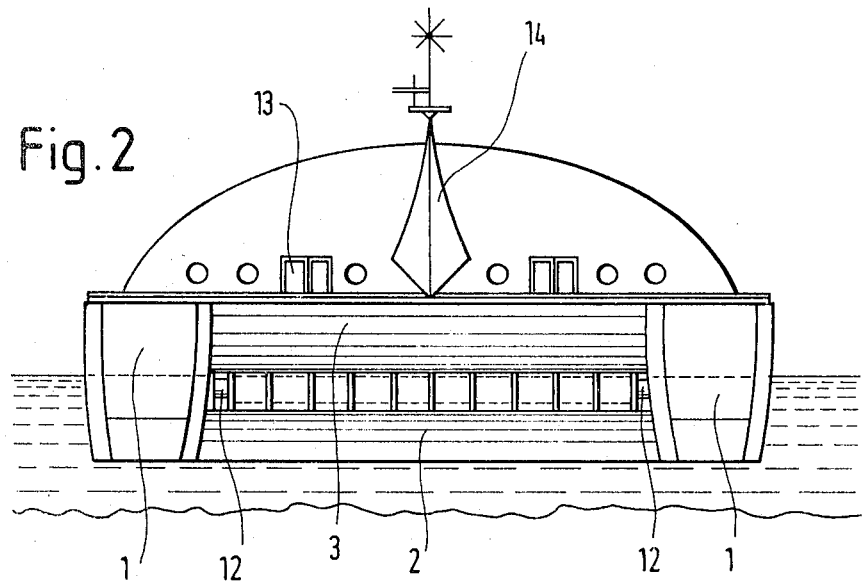

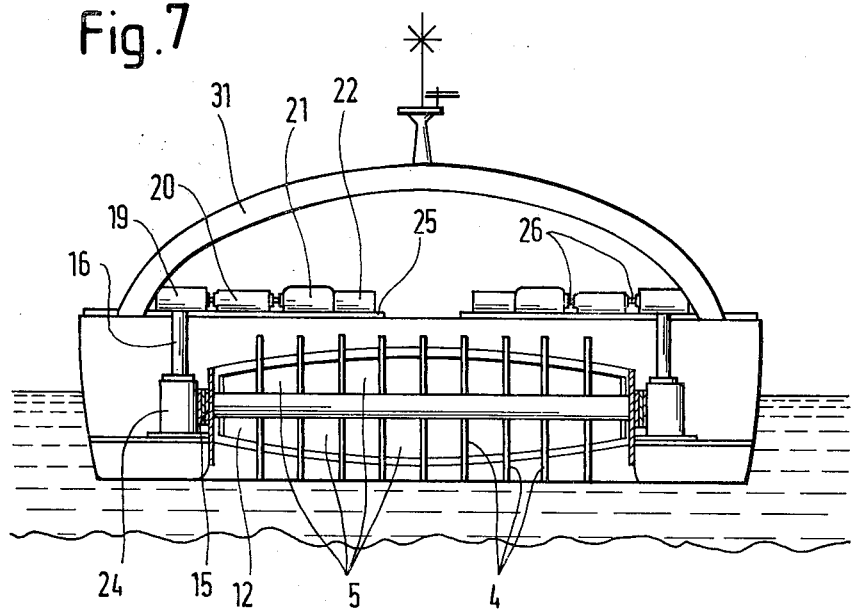

SYSTEM FOR THE GENERATION OF ELECTRICAL ENERGY BY UTILIZING THE KINETIC ENERGY OF SEAWATER

BACKGROUND OF THE INVENTION

The subject-matter of the present invention is a system for the generation of electrical energy by utilizing the kinetic energy of seawater. The generation of electrical energy from the rotary movement of a rotor or impeller by conversion using a generator is known per se. For example the potential energy of seawater is utilized in tidal power plants for the generation of electrical energy. However, on the other hand it is not yet possible to obtain electrical energy from the currents and motion of seawater on a practical scale, since the problems arising in the necessary large dimension systems in connection with stability have not yet been solved.

It is an object of the invention to provide a system which permits the generation of a large amount of electrical energy by utilizing the kinetic energy of seawater.

It is another object of the invention to provide a system for the generation of a large amount of electrical energy ensuring a satisfactory exploitation of the kinetic energy of the seawater.

It is a further object of the invention to provide a system for the generation of electrical energy by utilizing the kinetic energy of seawater in an economic operation.

It is a further object of the invention to provide a system for the generation of electrical energy by utilizing the kinetic energy of seawater which has the necessary stability even if it is built in very large dimensons.

These and other objects and advantages of the invention will be evident from the following description of the invention.

SUMMARY OF THE INVENTION

The subject-matter of the present invention is a system for the generation of electrical energy by utilizing the kinetic energy of the seawater which is characterized by a floating body comprising two oblong boat-shaped floating supports which are connected by a lower platform, a main deck and, between these two elements, an impeller with a horizontal axis, transmitting the motion of the impeller to an installation for converting the kinetic energy into electrical energy.

By means of the inventive system electrical energy can be generated by utilizing the kinetic energy of seawater even in places where the ocean currents are not particularly strong. This is achieved by the design of the inventive system which regulates and concentrates the current seawater towards the impeller. Thus in the system according to the invention the seawater reaches the impeller at a considerably increased rate as compared to that in the surroundings. By means of the gate provided in front of the impeller the access of the water to the impeller can be controlled as required. A particularly essential feature of the present invention is the especially stable large dimension impeller, whose width is for instance about 100 m and whose diameter is about 20 m. In the region of the impeller plate-shaped supports are provided between the lower platform and the main deck, which divide the vanes of the impeller into various sectors. The plates considerably stiffen and brace the whole structure, particularly in the region of the moving impeller.

BRIEF DESCRIPTION OF THE DRAWINGS

The accompanying drawing shows schematically an embodiment of the system according to the invention:

FIG. 1—face plan of the bow,
FIG. 2—face plan of the stern,
FIG. 3—a side view
FIG. 4—a horizontal section at the height of the impeller
FIG. 5—a horizontal section at the height of the machine park on the main deck,
FIG. 6—a top view of the covers
FIG. 7—a vertical section at the height of the impeller, and
FIG. 8—a longitudinal section of the system according to the invention.

DETAILED DESCRIPTION OF THE INVENTION

Figure 3:
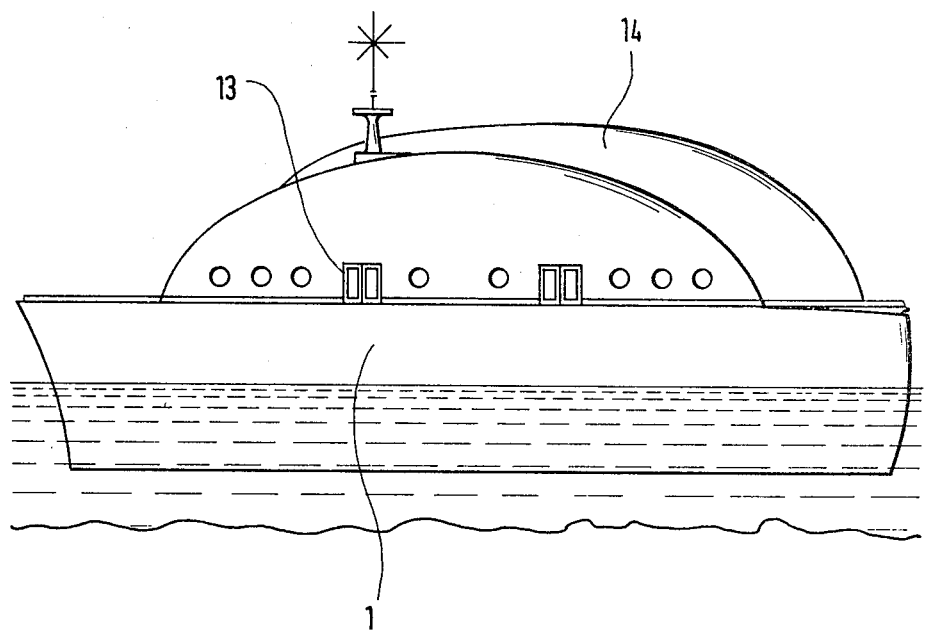

In order to achieve good results the system according to the invention is installed in suitable locations near the coasts and set in the direction where the water currents are most strong. Particularly suitable locations can be found near spits or in straits. In these locations the depth of water must be sufficient for the draught and the safety of the floating supports of the system.

The system according to the invention is a floating body which preferably consists of metal. It exhibits a solid structure which satisfies the safety requirements. The surface of the system is quadrangular with a parabolic-hyperbolic cover so as to offer the smallest possible resistance to the wind. This cover exhibits at its crowning a large rudder so as to orientate the floating base into the direction where the wind is strongest and the ocean currents are generally strongest too. The complete system is installed on two different levels which, despite the fact that each fulfills a different task, form the whole of the structure of the system according to the invention. The main level (main deck) is in its total outer circumference surrounded by a wide facing which forms part of the structure. Bow and stern have a larger surface. The stern is used as the quay for ships to land for various purposes or for the transportation of the machine park of the structure. The floating body is anchored at concrete blocks arranged at a corresponding distance around said body.

The whole upper surface of the lower platform and the lower surface of the main deck are provided to have in the area between the two floating supports from bow to stern a curved and inclined shape with respect to the imaginary horizontal plane of the sea, so that by the combined action of the bow parts and the inner walls of the floating bodies the whole energy of the water is fed and concentrated in the direction of the horizontal impeller.

The system according to the invention is a floating body with two floating supports. Said supports have the form of elongated boats. They consist preferably of a metallic material.

Below the water-line the two floating supports are connected by a lower platform which also consists of metal. While the lower surface of the lower platform is even and represents the keel of the floating body, the upper surface exhibits a characteristically shaped profile between the floating supports from bow to stern of the floating body. From the bow the upper surface of the lower platform first ascends in the direction of the impeller. In front of the place where the impeller is installed it descends and —by ascending anew behind the impeller—forms a kind of tub where the impeller is located. As already mentioned, the upper surface of the lower platform first ascends anew on the stern side of the floating body and then descends again. Thus the upper surface of the lower platform has a profile exhibiting two upward convex projections, one between the bow and the impeller, the other between the impeller and the stern. Between these two convex projections and in the location of the impeller is provided a tub-like recess.

Above the water-line the two floating supports are connected by means of the main deck of the floating body. The lower surface of said main deck inclines both from the bow and from the stern side in the direction of the location where the impeller is installed. Here the lower surface of the main deck forms an upward convex projection. Between said convex projection and the tub-like recess in the upper surface of the lower platform the impeller is located.

The main deck too is made of metal, preferably steel. Like the lower platform, the main deck is also a hollow body and thus contributes to the floatability of the floating body.

The impeller (bucket wheel or turbine) with a horizontal axis is arranged between the two floating supports and in the above-mentioned place between the upper surface of the lower platform and the lower surface of the main deck. It is situated approximately in the middle of the longitudinal plane of the floating body.

The horizontal axis of the impeller is preferably hollow so as to reduce the weight of the system. It is preferably made of special steel.

Where the impeller axis penetrates the inner side walls of the floating supports, the latter are particularly reinforced. These reinforcements contain the bearings for the rotary movement of the axis.

Since the impeller between the two floating supports of the inventive system is considerably broad, further reinforcements are provided in these regions so as to achieve the necessary stability. Over the whole breadth of the impeller and parallel to the longitudinal direction of the floating body, i.e. perpendicular to the impeller axis, are provided plates, preferably of special steel, which are located between the lower platform and the main deck and penetrated by the impeller axis. The impeller vanes are divided into several sections by these plates. Thus the impeller axis rotates on bearings located in the reinforcements of the inner side walls of the floating body on the one hand and at the points of penetration through the above-mentioned reinforcement plates on the other hand. Therefore the impeller does not have impellers or shovels extending over the whole breadth, but comprises a plurality of shovels in each sector divided by the reinforcement plates.

In a particularly preferred embodiment the impeller vanes are in each sector mounted on the axis in a staggered manner with respect to the adjacent sectors.

Although the number of the reinforcement plates is not particularly critical, they are preferably arranged at distances of approximately 10 m, so that nine such reinforcement plates are provided if the impeller's breadth is for instance 100 m.

The impeller vanes exhibit a curvature, the concave side of which faces in the direction of the bow of the floating body when the vane is below the axis. The number of the impeller vanes is not particularly fixed either. An embodiment with more than 10 vanes, for instance 12, is preferred.

By the location of the impeller between the two floating supports and the reinforcement plates arranged over its whole width an excellent stiffening of the complete construction is achieved, so that the inventive system can even withstand heavy seas.

The water entering the floating body from the bow finds a path whose cross-section tapers towards the impeller. Responsible for this are, on the one hand, the inner side walls of the floating supports extending inwards and, on the other hand, the ascending upper surface of the lower platform and the descending lower surface of the main deck. The cross-section in front of the impeller through which the water can flow is considerably smaller than the aperture of the floating body at the bow. At approximately the narrowest point in front of the impeller a gate is provided between the side walls of the floating supports, the upper surface of the lower platform and the lower surface of the main deck which regulates the water entering the impeller or prevents it from doing so. Preferably the gate is a large steel plate which, when opened, disappears into a slot in the hollow main deck. The gate can be opened and closed by mechanical or hydraulic means. By adjusting the passage height by means of the gate the amount of water reaching the impeller can be controlled simply.

The kinetic energy of the impeller received from the current of water is transmitted by its horizontal axis to two vertical axes via two conversion gears located at both lateral ends of the impeller axis in the floating supports. These vertical axes extending upwards in the direction of the main deck transmit the kinetic energy of the impeller to the machine park for conversion thereof into electrical energy. Said machine park is housed within a domed building on the main deck of the floating body. It consists of two units supplied by the two vertical axes in the two floating supports. Each unit comprises a main gear and an installation for the automatic control of the revolutions of the impeller and/or the subsequent generators for the generation of electrical energy, so as to achieve optimum operating conditions in view of the respective force of the seawater motion. If these generators are direct-current generators they may be followed by electromechanic or electronic alternators such as transformers of direct or alternating current (direct current motor followed by an alternator) or inverted rectifiers.

On the main deck is located in front of and behind the domed structure in the bow and stern region a free space for helicopters and ships of all kinds to land, for example for the transportation of supplies.

The main deck further exhibits a large rudder which turns the inventive system into the wind direction. Since the wind direction is usually also the preferred direction of the ocean current, it is easy to maintain the inventive system in the desired orientation.

The overall design of the inventive system is such that it offers as little resistance as possible to the wind and the waves of the sea.

Thus an essential feature of the inventive system is the design of the aperture in the bow of the floating body through which the seawater flows towards the impeller, and in the design of the impeller itself. As this design provides for solidity and stability, the system can be constructed in very large dimensions. Consequently a great amount of kinetic energy of the seawater can be utilized and converted in an economical manner into a considerable amount of electrical energy.

The system according to the invention will now be illustrated by means of the embodiment shown in the drawing.

FIG. 1 is a schematic view of the inventive system from the bow. In FIG. 1 number 1 designates the floating supports of the system with which the lower platform 2, the main deck 3 and the impeller 5 are firmly connected. FIG. 1 shows the inner side walls of the floating supports 1 extending inwards in the direction of the impeller 5, the upper surface of the lower platform 2 ascending in the same direction, as well as the descending lower surface of the main deck 3. The essential tasks of the floating supports 1 are to give the system floatability and stability. The upper surface of the lower platform 2 regulates and concentrates the seawater which enters the system through the front aperture. This upper surface is so formed that the water reaches the vanes or shovels of the impeller 5 at high velocity. The upper surface of the lower platform 2 extends over the whole length of the system from the bow aperture to the exit of the water at the stern. The lower surface of the main deck 3 likewise regulates and concentrates the water in the direction of the impeller 5 and at the same time functions as breakwater in case the water reaches this height. Together with the upper surface of the lower platform 2, the lower surface of the main deck 3 concentrates the water in the direction of the impeller 5 and as a result increases its velocity. 4 designates the platelike supports in the region of the impeller 5. These supports form part of the overall construction in vertical direction and contribute considerably to the stability of the system. They connect and brace the lower platform 2 with the main deck 3. Furthermore they divide the vanes of the impeller 5 into several sectors. In each sector the vanes of the impeller 5 are mounted to the central horizontal axis 12 of the latter. The mounting is effected in such a way that the vanes are in each sector mounted to the axis 12 in a position different with respect to the adjacent sectors. This arrangement prevents the impeller 5 from taking positions during its rotary movement in which the angle of the current water to the impeller 5 would be unfavorable.

In FIG. 1 number 6 represents the peripheral rail which protects the upper surface of the main deck 3. 7 designates the light and ventilation openings into the interior of the domed structure 8 in which the machine park is located. 9 designates a mast which carries instruments 10 and 11 for metereological and nautical measurements and signalling.

FIG. 2 is a schematic representation of the system according to the invention from the stern. This Figure too shows the floating supports 1, the upper surface of the lower platform 2 with its profile descending backwards from the impeller 5, as well as the lower surface of the main deck 3 with its profile ascending in the same direction.

In FIG. 2 number 13 designates the accesses to the domed structure 8 in which the machine park is located. 14 is the rudder which serves to turn the inventive system into the respective wind direction.

FIG. 3 is a schematic side view of the system according to the invention. It particularly shows the embodiment of the rudder 14.

Figure 4:
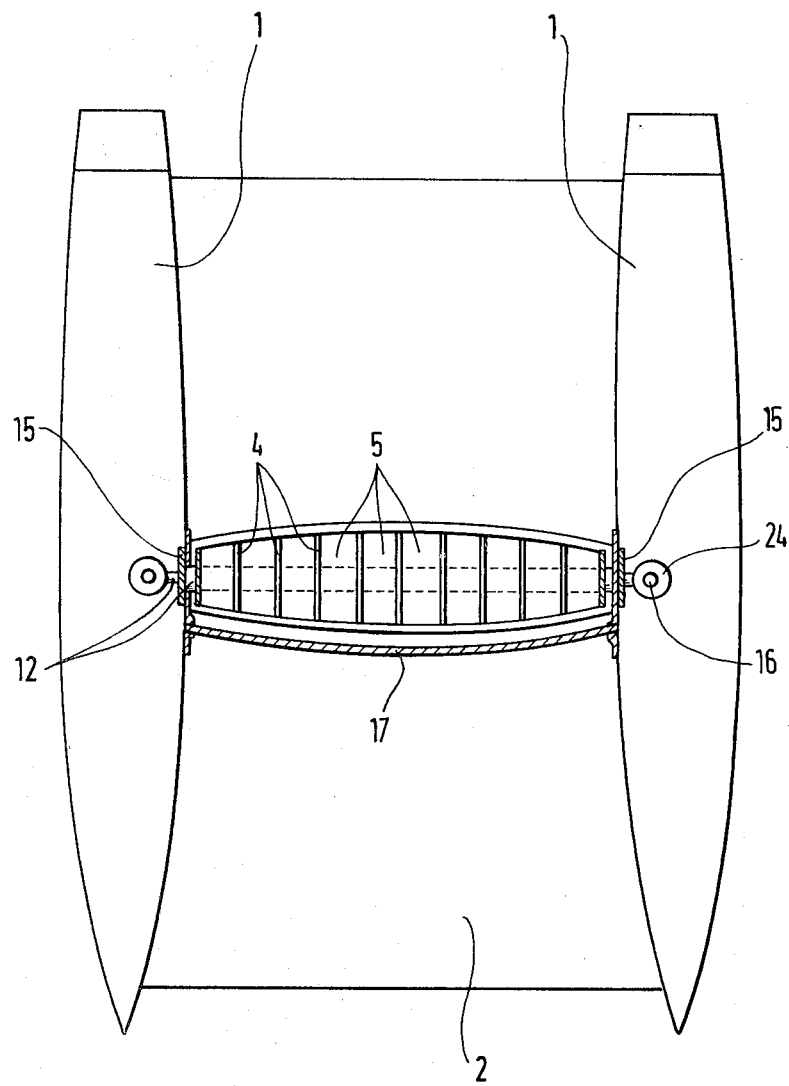

FIG. 4 is a horizontal section of the system according to the invention at the height of the impeller 5. Apart from the floating supports 1 and the upper surface of the lower platform 2 this Figure shows in particular the embodiment of the impeller 5 with its central horizontal axis 12, the vertical platelike supports 4 which divide the vanes of the impeller 5 into several sections, and the reinforcements 15 of the inner walls of the floating supports 1 at the points where the axis 12 penetrates said walls. FIG. 4 shows that in a preferred embodiment the impeller is formed in such a way that its diameter at the middle is greater than that at its ends.

In FIG. 4 number 24 designates the conversion gears arranged at both ends of the axis 12 and number 16 represents the vertical axes extending therefrom. 17 is the gate which can prevent the water from entering the impeller 5.

It can be seen that this gate is preferably curved in the direction of the bow of the floating body. The three last-mentioned elements will be explained in greater detail in connection with FIGS. 7 and 8.

Figure 5:
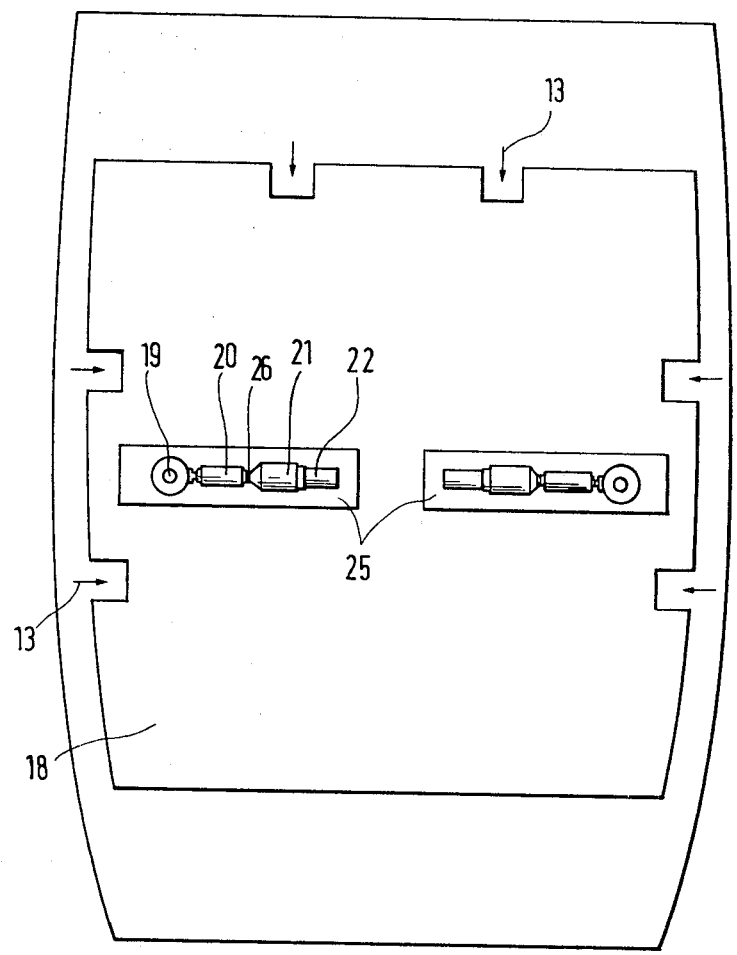

FIG. 5 is a horizontal section of the system according to the invention at the height of the upper surface of the main deck 3. In this FIG. 18 designates the machine park which is housed within the domed structure 8 with its accesses 13. In the machine park platforms 25 are provided which are isolated from the rest of the system for the absorption of oscillations. On these platforms 25 are located the installations for converting the kinetic energy of the impeller 5 into electrical energy. These installations consist of gears 19 which take up the rotary movement of the impeller 5 transmitted via the conversion gears 24 and the vertical axes 16. The gears 19 in turn initially transmit the kinetic energy via horizontal axes 26 to installations 20 for the automatic control of the number of revolutions. From here the kinetic energy is transmitted to generators 21 which convert it into electrical energy. 22 designates alternators and connection cases from which the electrical energy obtained is transmitted via underwater cables to transformer parks located on solid land.

Figure 6:
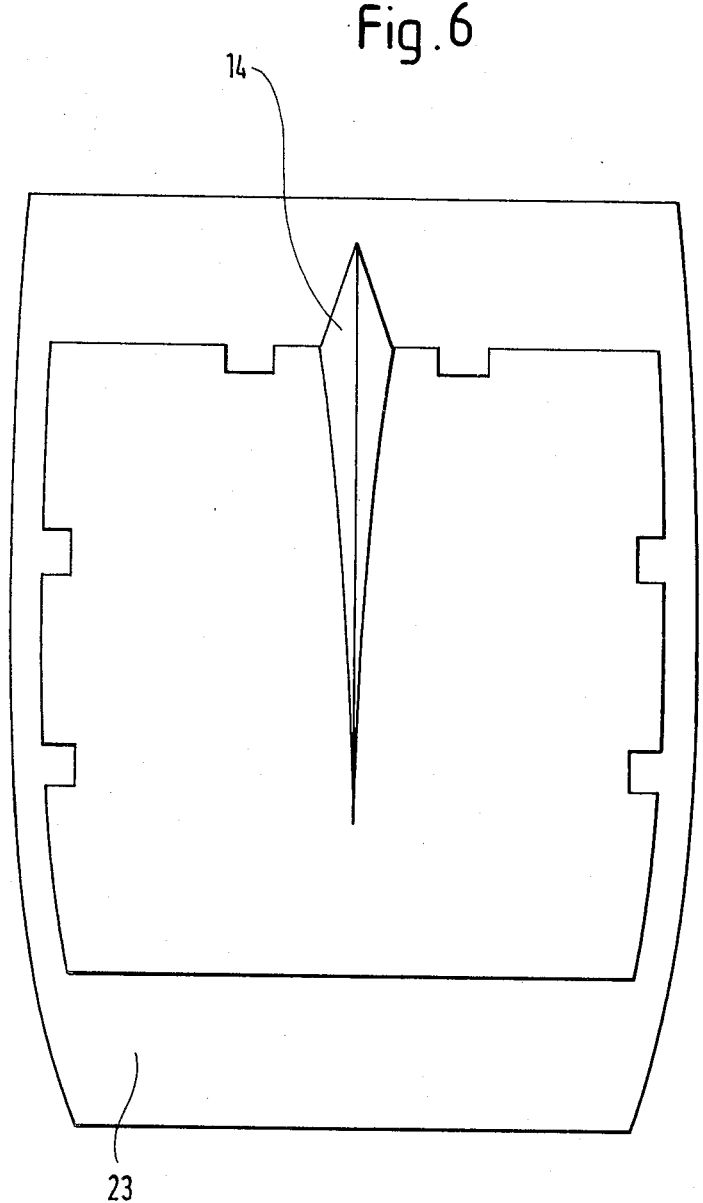

FIG. 6 shows a schematic top view of the system according to the invention, 23 designating the upper surface of the main deck 3.

FIG. 7 shows a schematic vertical section of the system according to the invention at the height of the impeller 5. This Figure shows particularly clearly the embodiment of the impeller 5 with its horizontal axis 12 and its connection via the conversion gears 24 and the vertical axes 16 with the installations for converting the kinetic energy of the impeller 5 into electrical energy located on the main deck 3. The axis 12 of the impeller 5 is hollow in order to prevent the system from being too heavy. It is carried by the reinforcements 15 at the inner side walls of the floating supports 1 and the platelike supports 4 in each of which are provided bearings for the rotary movement of the impeller. The conversion gears 24 are situated in the floating supports 1. In FIG. 7 number 31 designates the cross-section of the supporting rib of the domed structure 8.

FIG. 8 is a schematic longitudinal section of the inventive system in a plane between two of the supporting plates 4. This Figure shows in particular the profile of the upper surface of the lower platform 2 and the lower surface of the main deck 3. Both the lower platform 2, whose keel has the number 30, and the main deck 3 are hollow. In front of the impeller 5, whose vanes are curved in the manner shown, the gate 17 is located by means of which the access of the water to the impeller can be shut off or opened. When the gate 17 is opened it disappears into the slot 29 in the hollow of the main deck 3. The gate 17 can be opened and closed by means of mechanical or hydraulic means.

The example illustrates the invention.

EXAMPLE

A system suitable for practical use in the generation of electrical energy by utilizing the kinetic energy of seawater has the form shown in the Figures. The length of the floating supports is about 225 m, their greatest width about 30 m and their height about 40 m. The aperture for the entry of the water in the bow is approximately 135 m wide and approximately 28 m high. In the place where the gate is provided the aperture is only about 10 m high and about 105 m wide. The impeller has a width of about 100 m and its greatest diameter at the middle is about 22 m, while its side diameter is about 13 m. The impeller is divided into ten sectors by nine platelike supports. The platelike supports are arranged at a distance of about 10 m from each other.

The water is concentrated owing to the decreasing width of the aperture and particularly to the shape of the profile of the upper surface of the lower platform; thus the flow rate of the water is increased by at least a factor of 2.

I claim:

1. A system for the generation of electrical energy by utilizing the kinetic energy of seawater, comprising a floating body having two floating supports, which are connected by a lower platform, a main deck and an impeller mounted on a horizontal shaft arranged between the upper surface of the lower platform and the lower surface of the main deck for transmitting the motion of the impeller to an installation for converting the kinetic energy into electrical energy, wherein:

(a) the upper surface of the lower platform exhibits a profile which is curved upwards in the longitudinal direction between the bow of the floating body and the impeller and between the impeller and the stern of the floating body with said profile forming a tub-like trough at the location of the impeller wherein said profile between said impeller and said stern curves gradually upward from its formation of said trough with said gradual upward curvature extending in said longitudinal direction toward said stern, and the lower surface of the main deck descends both from the bow and from the stern of the floating body in the direction of the location of the impeller to form there an upward convex projection, the impeller being situated between the tub-like trough in the upper surface of the lower platform and the upward convex projection of the lower surface of the main deck with said impeller shaft extending transverse to said longitudinal direction;

(b) gate means are positioned for selectively closing the aperture between the inner side walls of the floating supports, the upper surface of the lower platform and the lower surface of the main deck approximately at its narrowest point in front of the impeller whereby when the gate is in said closed position the length of said gate extends substantially parallel to the length of said impeller shaft and said gate is located between said bow and the forward-most position of said impeller;

(c) vertical plate-like supports oriented in longitudinal direction of the floating body are located in the region of the impeller between the lower platform and the main deck which supports divide the vanes of the impeller along their width into several sections while being penetrated by the impeller shaft;

(d) the vanes of the impeller are mounted on the impeller shaft in each of the sectors formed by the plate-like supports in such a way that they are staggered with respect to the adjacent sectors; and wherein, (e) the diameter of the impeller is greater at the middle than at the ends.

2. A system according to claim 1 wherein the gate, when opened, is withdrawn into a slot into the hollow of the main deck.

3. A system according to claim 1 or 2 wherein the inner side walls of the floating supports are reinforced in the region of the impeller and the gate.

4. A system according to claim 1 wherein the impeller shaft is hollow.

5. A system according to claim 1 wherein the kinetic energy of the impeller is transmitted by its shaft via conversion gears arranged at the lateral ends of the shaft and perpendicular shafts issue from said gears to the installation for converting the kinetic energy into electrical energy located on the main deck.

6. A system according to claim 1 or 2 wherein a couplar structure is provided on the main deck in which the machine park of the installation for the conversion of the kinetic energy into electrical energy is located.

* * * * *